United States Patent [19]

Hardigg

[11] 4,180,232
[45] Dec. 25, 1979

[54] TRUSS PANEL MOLD

[76] Inventor: James S. Hardigg, Baptist Hill, Conway, Mass. 01341

[21] Appl. No.: 759,233

[22] Filed: Jan. 13, 1977

[51] Int. Cl.² .............................................. B28B 7/34
[52] U.S. Cl. ........................................ 249/60; 249/80; 249/102; 249/109; 249/135
[58] Field of Search ................ 249/60, 109, 110, 130, 249/135, 160, 102, 156, 80; 425/577, 588, 572

[56] References Cited

U.S. PATENT DOCUMENTS

| | | | |
|---|---|---|---|
| 1,409,591 | 3/1922 | Schavoir | 249/102 |
| 2,566,817 | 9/1951 | Yellin | 249/60 |
| 3,333,300 | 8/1967 | Cohan | 425/577 |
| 3,790,371 | 2/1974 | Karlyn | 249/135 |
| 3,871,611 | 3/1975 | Taketa | 249/102 |

FOREIGN PATENT DOCUMENTS 883932  10/1971  Canada .................................... 249/102

*Primary Examiner*—John McQuade
*Attorney, Agent, or Firm*—Cushman, Darby & Cushman

[57] ABSTRACT

An apparatus is disclosed for forming an integrated truss structure wherein the apparatus includes a plurality of male mold members each having a plurality of open grooves formed therein which slope away from the top surface thereof. A plurality of female mold members each have a generally circular recessed cavity with a plurality of open grooves which are orthogonally disposed with regard to one another and which slope away from the plane of the recessed cavity. The male and female members are positioned opposite one another with the grooves in the male and female members being aligned to define strut beam chambers and wherein the top of the male member is aligned with the recessed cavity of the female member to define a junction chamber. Thus, the strut beam chambers slope away from the junction chamber. One of the male members is positioned adjacent each female member, and vice versa, to thereby define alternate symmetrical upper and lower junction chambers interconnected by the strut chambers. Channels are formed, preferably in the female members, for injecting a moldable material such as plastic into the strut beam chambers and the junction chambers. After injection occurs, the molds are separated to thereby form an integrally molded truss structure.

7 Claims, 12 Drawing Figures

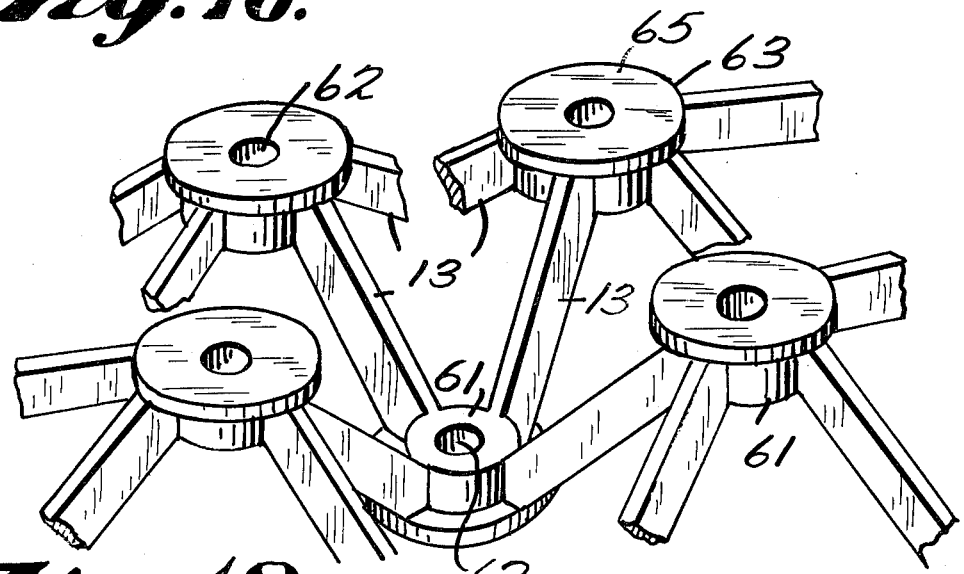
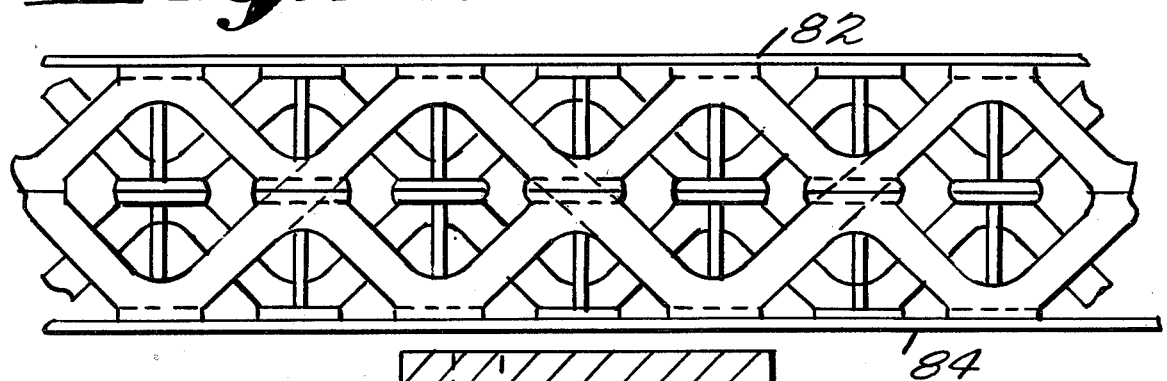
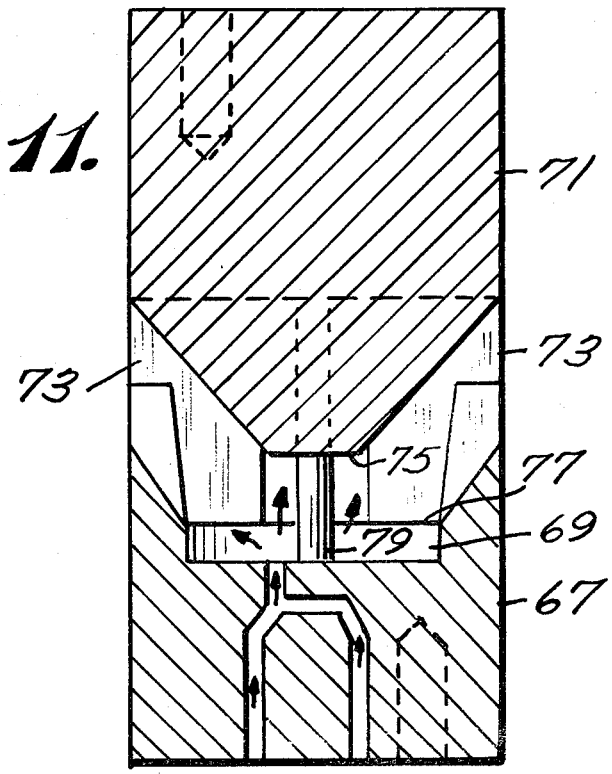

TRUSS PANEL MOLD

BACKGROUND OF THE INVENTION

This invention relates to an apparatus for forming a moldable integrated truss structure.

Numerous efforts have been made in the past for providing improved truss structures and for reducing the time and expense involved in manufacturing such truss structures. As is known in the art, truss structures typically are utilized to provide support for a thin material such as a metallic skin, a floor, roof or wall or other such surface which is not capable by itself of supporting shear, bending and axial loads in various directions. Most truss structures, are formed of a plurality of diagonal strut members which are joined together by means of rivets, welds, or a nut and bolt arrangement. Examples of such prior art truss structures may be found in Bunker, U.S. Pat. No. 2,123,931 and Troutner, U.S. Pat. No. 3,541,749. In each of these patents, a truss structure is disclosed which requires a substantial amount of labor to join the strut beams to one another to provide a truss which is capable of supporting forces acting thereagainst. Another example of such a truss structure is disclosed in Snyder et al, U.S. Pat. No. 3,415,027 wherein an unsymmetrical truss structure is formed of a plurality of steel beams which must be joined to one another by means of a riveting process which requires a substantial amount of labor.

Kastan disclosed in U.S. Pat. No. 2,791,386 a symmetrical truss structure having a plurality of strut elements joined at bosses at the top and bottom of the truss. The truss structure is capable of transmitting shear, bending and axial loads in any direction and is used for the cores of aircraft wings, structural panels and box type structural beams. There is no disclosure of a method of forming this truss structure as an integral unit, such as, by means of an injection molding process.

Other forms of reinforcing structures are illustrated in Pajak, U.S. Pat. No. 2,609,068 and Plumley et al, U.S. Pat. No. 2,849,758 wherein a honeycomb structure is disclosed. The drawbacks to a honeycomb structure are that substantial manual labor is required to join the honeycomb elements together and once formed it is difficult to provide an insulating means for the structure if such is desired, i.e. insulation or foam cannot be injected through the honeycomb structure to provide an insulation medium.

Each of the aforementioned types of truss structures have the drawback that each require a relatively large amount of manual labor for forming the truss structure which inherently drives up the cost of such structures. Therefore, there is a need in the art for a simplified truss structure which can be formed with a minimum of labor to thereby reduce the cost of such structures.

It is another object of this invention to provide an apparatus for forming an integrated truss structure.

SHORT STATEMENT OF THE INVENTION

Accordingly, this invention relates to a mold for forming an integrated truss structure wherein the mold comprises a plurality of male mold members each having a plurality of open grooves which may be orthogonally disposed with respect to one another or in the alternative may be disposed at 60° angles with respect to each other when viewed in a direction normal to the plane of the skin supported by the truss. The grooves slope away from the top surface of the mold member. A plurality of female mold members each have a generally recessed cavity with a plurality of open grooves which are aligned to mate with the grooves in the male mold members. These grooves slope away from the plane of the recessed cavity. The male and female members are positioned opposite one another with the grooves in the male and female members being aligned to define strut panel chambers and with the top of the male member being aligned with the recessed cavity of the female member to define a junction chamber. The male members are each positioned adjacent a female member and vice versa to thereby define alternate symmetrical upper and lower junction chambers interconnected by the strut beam chambers. A means is provided for injecting a moldable material into the strut beam chambers and the junction beam chambers to thereby form the integrated truss panel.

In an alternate embodiment, integrated male and female mold members are formed. In this embodiment, a first fixed mold member includes a plurality of spaced, raised flat portions together with a plurality of spaced, recessed flat portions and a plurality of open grooves connecting the raised and recessed portions. A second movable mold member includes a plurality of spaced, raised flat portions and a plurality of spaced recessed flat portions with a plurality of open grooves connecting the raised and recessed portions. The mold members are positioned in opposing relationship with respect to one another wherein the raised portions of the first member is aligned with the recessed portions of the second member and vice versa. The alignment of the raised and recessed portions define a junction chamber and the alignment of the open grooves define the strut beam chambers. An injection means is provided for injecting a moldable material into the thus formed chambers.

BRIEF DESCRIPTION OF THE DRAWINGS

Other objects, features and advantages of the present invention will become more fully apparent from the following detailed description of the preferred embodiments, the appended claims, and the accompanying drawings in which:

FIG. 10 is a partial perspective view of an alternate embodiment of a truss structure formed by an alternate molding apparatus of the present invention;

FIG. 11 is a section view illustrating the opposed male and female members for forming the truss structure of FIG. 10; and FIG. 12 is a alternate truss structure having an interlaced strut beam structure capable of being formed by the apparatus of the present invention.

DETAILED DESCRIPTION OF THE PREFERRED EMBODIMENT

Figure 1:
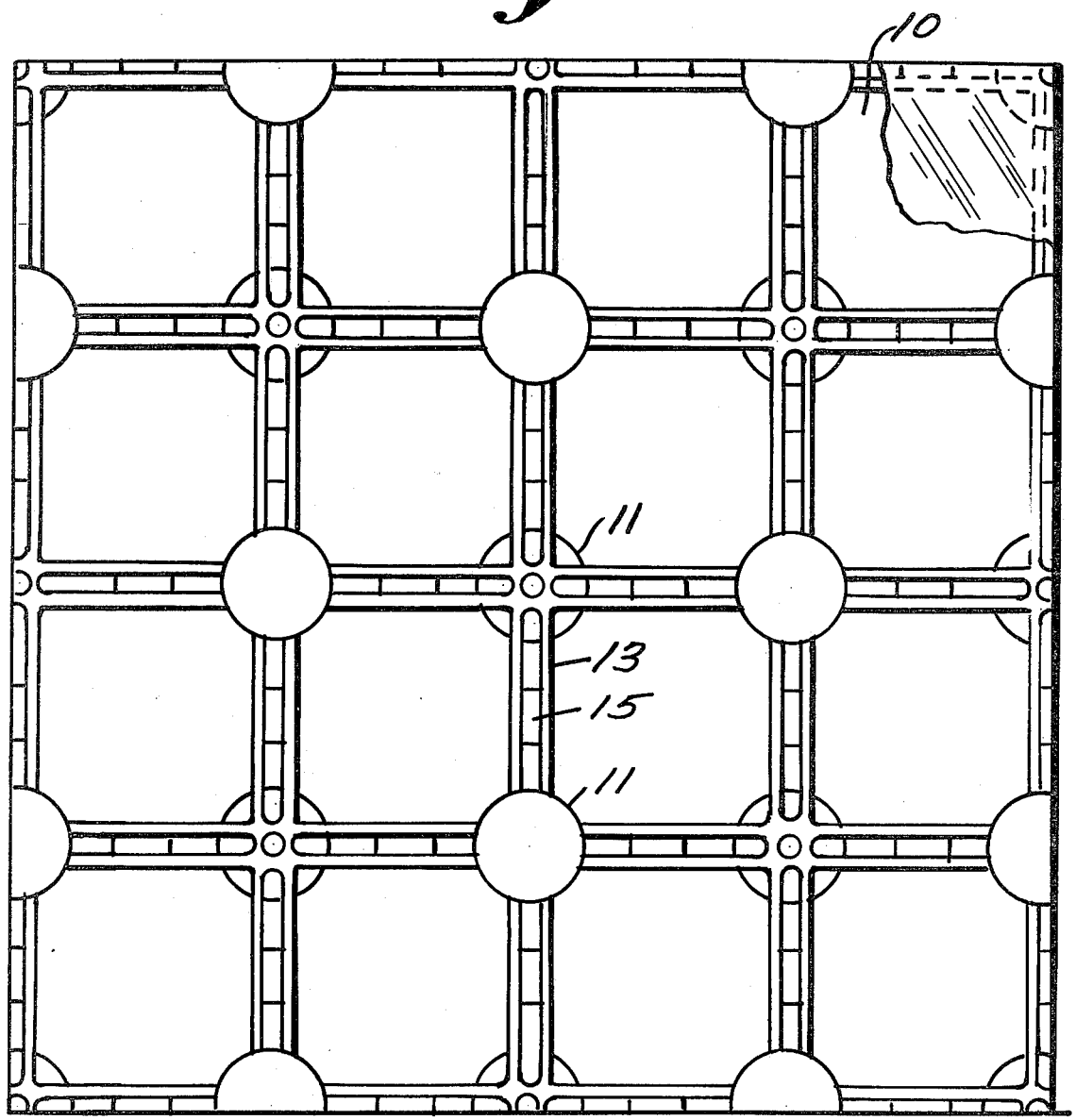
FIG. 1 is a plan view of the integrated truss structure formed by the apparatus of the present invention.

The present invention will now be described in connection with the preferred embodiments thereof. Before describing the apparatus for forming a truss structure, refer to FIGS. 1–3 where there is illustrated the truss structure to be formed by the apparatus of the present invention. As illustrated, the truss structure includes a plurality of symmetrically disposed junction plates 11 which are alternately positioned on the top and bottom of the truss. Each of the junction plates 11 are joined to an adjacent junction plate positioned on the opposite side of the truss structure by means of strut beams 13. The strut beams 13 may be formed of a single element or as illustrated in FIG. 1, a pair of elements 13 joined together by means of a web 15. The strut beams 13 extend outwardly away from the junction plates 11 and are joined at the adjacent junction plate on the underside thereof as illustrated. As illustrated the strut beams are orthogonally disposed with respect to one another. However, it should be understood that three beams could extend outwardly from the junction plates at equal angles with respect to one another if desired. Other beam configurations are possible in keeping with the concept of the present invention. Each of the junction plates 11 is formed with a flat surface so that a skin 10 such as a metallic or plastic plate can be attached thereto by suitable means, such as, for example, glue, electromagnetic bonding, rivets or screws. If rivets or screws are to be used to secure the skin to the truss structure, holes 62 are formed in the junction plates 11 as illustrated in FIG. 10. The material for forming the truss structure may be a plastic material such as linear polyethylene or polycarbonate and in fact, could be formed of any plastic or metallic material for which a mold material is available to withstand the temperature, pressure and other requirements for molding same.

Figure 4:
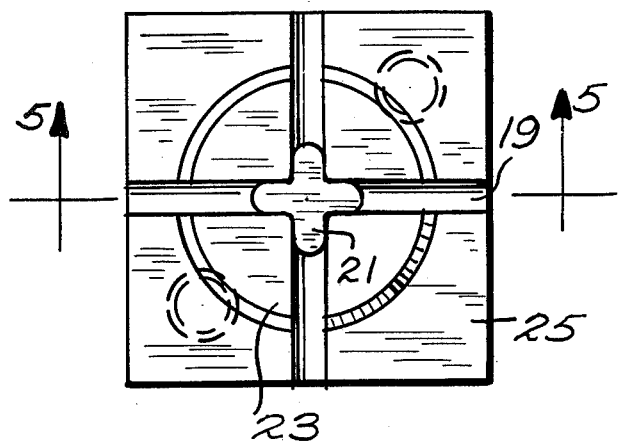
FIG. 4 is a plan view of a male mold member for forming a truss structure.
Figure 5:
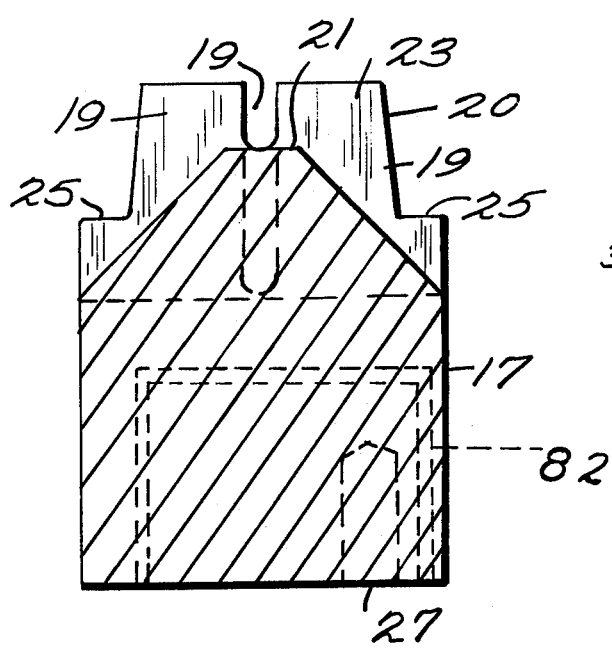
FIG. 5 is a section view taken along the lines 5—5 of FIG. 4 of the male mold member.

Refer now to FIGS. 4 and 5 where there is illustrated one of a plurality of male mold sections which form the mold for forming an integrated truss structure. As illustrated in FIG. 4, the mold includes a metal molding block formed, for example, from beryllium copper castings. The beryllium copper castings are subjected to several thousand pounds per square inch pressure while solidifying the mold. Beryllium copper is advantageous because of its good heat conducting properties which result in a fairly rapid and uniform cooling of the mold after the hot plastic or metallic material which is to form the truss structure is injected into the mold. The male mold member 17 has four orthogonally disposed grooves 19 formed therein which slope downwardly and away from a plateau 21. In the preferred embodiment, the grooves slope away from the plane of the plateau 21 at a strut angle of approximately 45°, although it should be appreciated that the strut angle can be varied depending upon the structural requirements of the panel or skin which the truss supports. It further should be understood that this angle can be different in one direction than in an orthogonal direction. Thus, with reference to FIG. 1 the junction plates 11 in one direction would be closer together than in a direction at a right angle thereto.

The male member 17 has an upper surface 23 which as will be seen mates with a recess cavity in the female mold member to define a junction chamber for forming the junction plates 11. The male member also includes a mold bearing surface 25 which bears against the corresponding surface on the female mold members to define the molding position of the male and female mold members. Referring to FIG. 5, which is a cross-sectional view of the male mold member taken along the lines 5—5 thereof, the grooves 19 are shown sloping downwardly away from the plateau 21 at about a 45° angle. The top surface 23 extends upwardly from the plateau 21 and forms the mold surface for the underside of the junction plates 11. The male mold member is fixedly secured to a support plate by means of for example, one or more screws which are inserted into the hole 27 formed in the base of the male mold member. A suitable alignment means such as a dowel can be utilized to insure that each mold member is positioned on the support plate directly opposite its mating member. It should be appreciated that cooling channels 80 and 82 as illustrated in FIGS. 5 and 7 could be formed in the mold member for the purpose of carrying the heat of the molten plastic or metal away from the mold block to thereby facilitate the cooling of the molded material.

Figure 6:
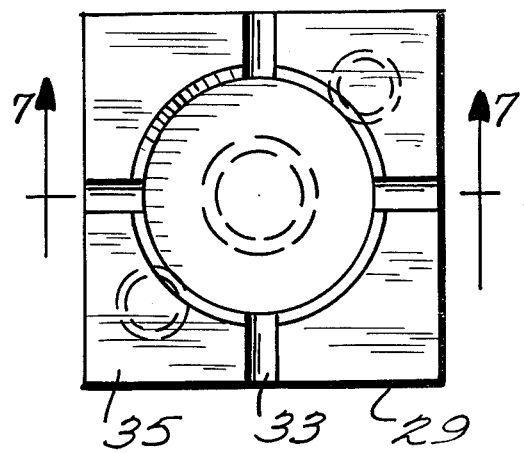
FIG. 6 is a plan view of a female mold member for forming a truss structure.
Figure 7:
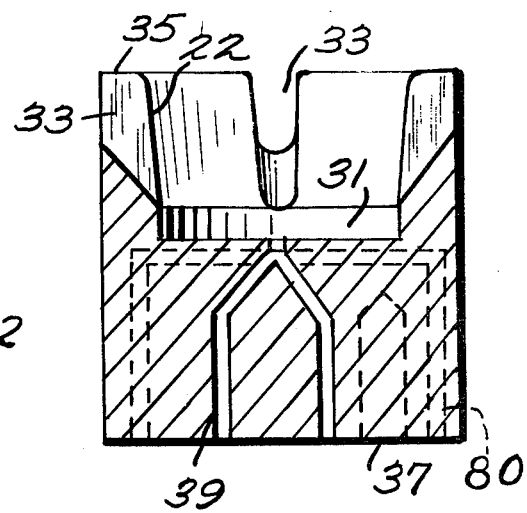
FIG. 7 is a section view taken along the lines 7—7 of FIG. 6.

Refer now to FIGS. 6 and 7 where there is illustrated a female mold block. The female mold block 29 includes a recessed cavity 31 having a plurality of grooves 33 extending upwardly, and away therefrom at about a 45° angle with respect to the plane of the bottom surface of the recessed cavity. The mold block as illustrated in FIG. 7 has an upper bearing surface 35 which bears against the surface 25 of the male mold member 17 when the two blocks are positioned one opposite the other in preparation for injecting a mold material there. The female mold block is secured to a base support plate (not shown) by means of one or more screws which are inserted into the threaded holes 37 or securement can be achieved by other techniques known in the art. As aforementioned, the female members can be aligned by a suitable means such as dowels to insure the proper alignment with the mating male member. The male and female mold blocks when positioned opposite one another in a mating relationship define a junction chamber and a plurality of strut beam chambers. In order to facilitate separation of the male and female mold members, the cone angle, i.e., the angle at which the sides 20 and 22 of the male and female members, respectively, slope with respect to the axis of the mold travel, is made a suitable size which may vary depending upon the temperature and mold materials utilized. However, this angle preferably should not be so great that the side wall 22 of the female member intersects the side wall of the mold below the mating plane 25.

It should also be appreciated that the grooves must have a draft, i.e., slightly inclined walls, so that the molded truss structure can be easily removed from the mold members. A molten molding material such as a plastic or metallic material is injected into the female mold via channel 39 and then into the recessed cavity 31 when the female mold member and the male mold member are positioned opposite one another.

Figure 8:
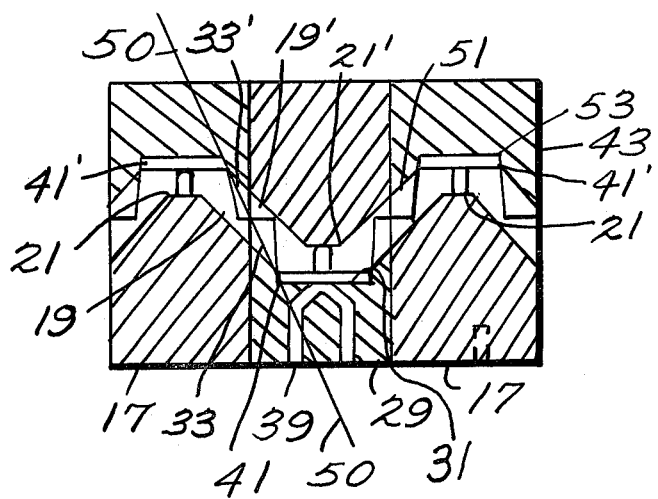
FIG. 8 is a simplified section view of three sections of the mold for forming the truss structure.
Figure 9:
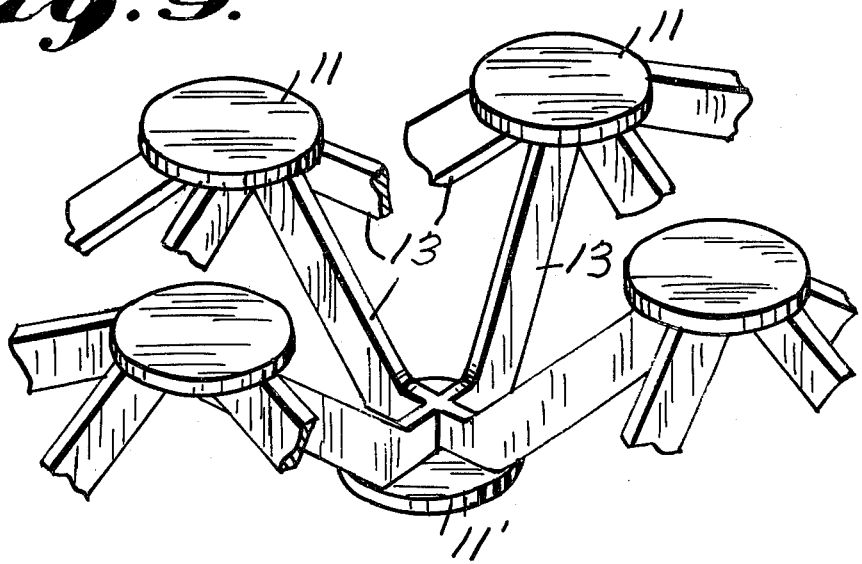
FIG. 9 is a partial perspective view of this truss structure formed by the apparatus of the present invention.

Refer now to FIG. 8 where there is an illustration of how the respective male and female members are aligned to obtain the truss structure illustrated in partial perspective in FIG. 9. As illustrated in FIG. 8, male and female mold members are positioned alternately with respect to one another so that a female mold member is positioned adjacent each male mold member and vice versa. Thus female mold member 29 has positioned against each of its sides a male mold member 17 to thereby form a first mold member having a plurality of raised plateaus 21, and a plurality of spaced recessed flat portions 31 each connected by means of open grooves 19 and 33. A second plurality of male and female members are joined together to form a second, movable mold member 43. This mold member also has male and female members alternately positioned against one another as illustrated to define a plurality of raised cavities 41', and a plurality of plateaus 21', each joined together by means of open grooves 19' and 33'. In the preferred embodiment, the bottom mold is formed by joining a plurality of mold members by fixedly securing these members to a base plate (not shown). The upper mold 43 is also joined to a support plate (not shown), but is movable with respect to the lower mold so that once the mold material is injected into the mold, the upper mold can be moved away from the lower mold to thereby free the truss structure for removal of the mold. When the upper mold 43 is moved into position with respect to the lower mold, the bearing surfaces 25 and 35 serve to define the final position of the upper mold with respect to the lower mold. When this occurs, a plurality of strut beam chambers 51 are formed from the open grooves 17, 17', 19 and 19'. In addition, a plurality of junction plate chambers 53 are formed by means of the recessed cavities 31, and the upper surface 23 of the male mold members. A molten mold material such as a plastic material or metallic material is injected into the strut beam chambers and the junction plate chambers thus formed through annular channel 39. The channel 39 is preferably formed in one or more of the female mold members which are secured to the bottom support plate. If desired, a heating element can be positioned in one or more of the female mold members which are utilized for injecting plastic or other mold materials for the purpose of maintaining the temperature of the molten mold material at a substantially uniform high temperature.

Figure 2:
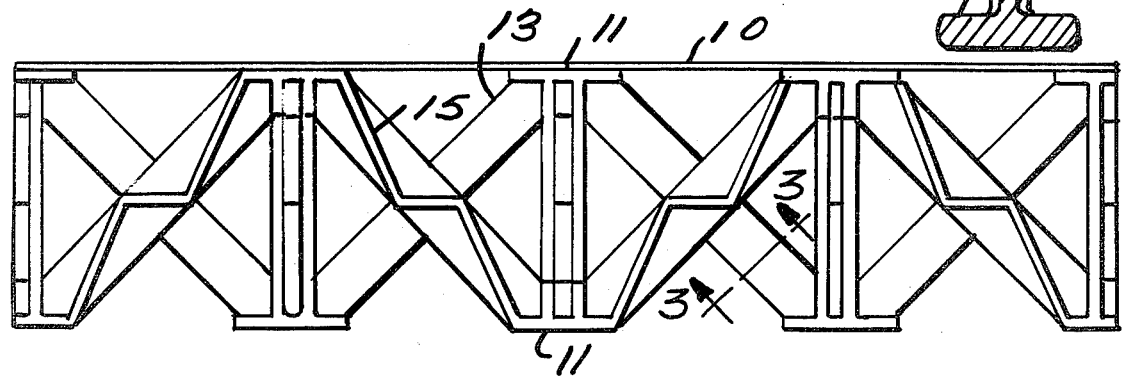
FIG. 2 is a side elevation view of the truss structure of FIG. 1.
Figure 3:
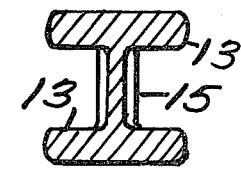
FIG. 3 is a section view taken along the lines 3—3 of FIG. 2 of a strut beam of the truss structure formed by the apparatus of the present invention.

After the molten mold material has been injected into the chambers defined by the upper and lower molds, the upper mold is removed away from the lower mold with the truss structure illustrated in partial perspective view in FIG. 9 resulting therefrom. In FIG. 9, a plurality of junction plates 11 are formed, each spaced symmetrically with respect to one another and with respect to the junction plates 11' on the opposite side of the truss structure. Each of the junction plates are joined to one another by means of strut beams 11 which are integrally molded with junction plates 11 and 11'. As illustrated in FIG. 9, each strut beam is a single beam, however, it should be understood that, in keeping with the present invention, by a simple modification of the mold structure a double or I beam structure could be provided such as illustrated in FIGS. 1-3.

If desired, rather than form the upper and lower mold out of a plurality of male and female mold members, a single mold member could be formed. This would require appropriate machining in order to insure that the positions of the plateaus 21, the recess cavities 41, and the open grooves are in alignment with respect to one another.

In such an integrated mold structure the cone angle should not be greater than the angle formed by a line 50 shown in FIG. 8 extending from the edge of one recessed cavity 41 to the edge of an adjacent oppositely disposed cavity 41. This will enable the male and female cones not to be truncated on their sides.

In the alternative, mold modules formed of a group of individual molds, e.g. 32 mold members, could be made. In turn a plurality of such mold moduli would thus make up a complete mold structure. This has the benefit of avoiding cumulative dimensional error which could result from making a large integral mold.

In the present case, individual male and female mold members were joined to one another on a base plate to form the upper and lower mold members because of the simplicity of the structure thereof and because of the flexibility of size of the truss structure which can result by adding or subtracting male and female members from the upper and lower mold members.

Refer now to FIGS. 10 and 11 where there is illustrated an alternate embodiment of the apparatus of the present invention for forming a truss structure having hollow annular bosses 61 which permit the use of rivets, screws or inserts to fasten a skin material to the truss structure. The annular bosses may also be provided in a panel where the junction plates are adhered or welded to the skins. In this case the bosses provide strong points for attaching other structures to the panel by fasteners such as screws or blind rivets. Thus, as illustrated in FIG. 10, the truss structure is formed of a circular junction plate 63 having a flat upper surface or skin attachment surface 65 with the junction plate having a hole 62 through the center thereof. On the underside of the junction plate 63 is formed an annular, hollow boss 61, which serves as a reinforcement for the junction of the strut beams and the junction plate 63. Such a truss structure may be formed from a mold comprising a plurality of male and female mold members of the type illustrated in FIG. 11. Thus, as is illustrated in FIG. 11, a female mold member 67, is of the same design as the female mold member of FIGS. 6 and 7 with one important exception. The exception relates to the manner in which the molten moldable material is injected into the chambers defined by the juxtaposition of the male and female mold members. Thus, since a hole 62 is to be formed through the junction plate 63, no molten material can be injected into this region of the truss structure. Thus, the point at which the mold material is injected into the mold must be off-center from the center of the recessed cavity 69 as illustrated in the figure.

The male mold member 71 includes a plurality of open grooves 73 together with a plateau surface 75, and an upper surface 77. However, a center post 79 must be formed either in the male mold member 71 or the female mold member 67 or in both in order to define a circular area about which the moldable material flows but by which no moldable material can flow into a cylindrical air volume defined by the post 79. This volume results in the formation of the hole 62 in the junction plate 63. As aforementioned, in connection with the description of the composite mold structure of FIG. 8, a plurality of mold members are joined to one another with the female and male mold members being juxtaposed alternately to thereby define upper and lower mold members. In the alternative, rather than providing a plurality of male and female mold members which are fastened onto a back plate next to one another, an integral upper and lower mold member may be machined to have the same configuration as the plurality of juxtaposed male and female mold members.

Refer now to FIG. 12 where there is illustrated a high strength truss structure having an interleaved strut beam structure. The molded truss structure of FIG. 12 is formed by simply joining together two truss structures of the type illustrated in FIG. 9. The truss structures can be joined together by any suitable means known in the art such as for example, by the use of adhesive compounds. As a result of joining the two truss structures, it can be seen that twice as many strut beams can be provided for a given thickness of the truss structure as would be possible if the two truss structures were not joined together. Thus, with reference to FIG. 12, shown in dotted lines is the strut beam structure which would result from a truss beam formed from a single mold. It can readily be seen that by fixing one truss structure with respect to another that twice as many junction plates 11 per unit length parallel to the skin or surface supported by the truss and twice as many strut beams 13 are formed as would ordinarily be formed by a single molding step utilizing the same strut angle. The buckling resistance of the skins 82 and 84 will be increased because of the increased closeness of the junction plates 11 or in the alternative thinner skins can be used.

The lamination or joining of truss structures can be increased in number beyond two as required for strength, stiffness, or other requirements. Intermediate skins may be attached between the layers of truss structure, in addition to the outer skins for various purposes such as improved thermal insulation in translucent panels.

It can be seen that by the present invention an improved integral molded truss structure is formed which does not require the use of rivets, bolts or other means for connecting strut beams to surface plates, and hence, substantially reduces the time involved for making the truss structure. Further, it can be appreciated that by altering the angle of the open grooves in the male and female members, the thickness of the truss structure can be varied as well as the strength thereof. The mold can be made of beryllium copper, steel, ceramics or other suitable material or various combinations of materials depending on the materials used to form the truss structure.

The truss structure of the present invention can be utilized to form flat or curved panels utilizing a minimum of material to efficiently attain strength and rigidity. The panels so formed may be used for containers, transportation vehicles, buildings and structures of many kinds.

What is claimed is:

1. A mold for forming an integrated truss structure comprising:
   a plurality of male mold members, each of said male mold members having a top surface, and a plurality of open grooves formed in said top surface and sloping away therefrom,
   a plurality of female mold members, each of said female mold members having a recessed cavity therein, said cavity having a generally flat surface and a plurality of open grooves formed in each of said female mold members and sloping away from said surface of said cavity;
   said male and female mold members being positioned opposite one another with said open grooves in said male and female mold members being aligned to define strut beam chambers and said top surfaces of said male mold members being aligned with said recessed cavities in said female mold members to define junction chambers, one of said male mold members being positioned adjacent each female mold member, and vice versa, to thereby define alternate symmetrical upper and lower junction chambers interconnected by said strut beam chambers, and
   means in at least one of said mold members for permitting the injection of a moldable material into said strut beam chambers and said junction chambers.

2. A mold for forming an integrated truss structure comprising:
   a first fixed mold member including a plurality of spaced raised flat portions, a plurality of spaced recessed flat portions, and a plurality of open grooves connecting said raised and recessed flat portions, said open grooves sloping from said raised flat portions to said recessed flat portions,
   a second movable mold member, including a plurality of spaced raised flat portions, a plurality of spaced recessed flat portions, and a plurality of open grooves connecting said raised flat portions and said recessed flat portions, said open grooves sloping from said raised flat portions to said recessed flat portions, said first and second mold members being positioned in opposing relationship with respect to one another wherein said raised flat portions of said first member are aligned with said recessed flat portions of said second member, and vice versa, the position of said raised and recessed flat portions of said first and second mold members defining a plurality of junction chambers, and the position of said open grooves of said first and second mold members defining a plurality of strut beam chambers, and
   means in at least one of said mold members for permitting the injection of a moldable material into said chambers.

3. The mold of claim 2 wherein said male and female mold members comprise beryllium copper.

4. The mold of claim 2 further comprising means in said male and female mold members for cooling said male and female mold members.

5. A mold for forming an integrated truss structure having a plurality of symmetrically disposed junction plates on each side of said truss structure with said junction plates being interconnected by a plurality of orthogonally disposed strut beams, said mold comprising:
   a plurality of male mold members, each of said male mold members having a top surface, and a plurality of open grooves formed in said top surface and sloping away therefrom,
   a plurality of female mold members, each of said female mold members having a recessed cavity therein, said cavity having a generally flat surface and a plurality of open grooves formed in each of said female mold members and sloping away from said surface of said cavity, said male and female mold members being positioned opposite one another with said open grooves in said male and female members being aligned to define strut beam chambers and said top surfaces of said male mold members being aligned with said generally flat surface in said recessed cavities of said female mold members to thereby define a plurality of junction chambers, said strut beam chambers sloping away from said junction chambers at a predetermined angle, one of said male mold members being positioned adjacent each side of said female mold members, and vice versa, to thereby define alternate symmetrical upper and lower junction chambers interconnected by said strut beam chambers, and means in at least one of said mold members for permitting the injection of a moldable material into said strut beam chambers and said junction chambers.

6. A mold for forming an integrated truss structure comprising:

a plurality of male mold members, said members each having a plurality of open grooves formed therein and having a top surface with annular groove formed therein, a post extending upwardly away from the plane of said top surface at the center of said grooves, said plurality of grooves sloping away from said top surface, a plurality of female mold members, said female mold members each having a recessed cavity having a flat surface and a plurality of open grooves sloping away from the plane of said flat surface, said male and female mold members being positioned opposite one another with said open grooves in said male and female mold members being aligned to define strut beam chambers, and said top surface of each of said male mold members being aligned with said cavity of each of same female mold members to define a plurality of junction chambers, said posts each extending upwardly from a male mold member against the surface of said cavity of an opposed female member, and means in at least one of said mold members for permitting the injection of a moldable material into said truss beam chambers and said junction chambers.

7. The mold of claim 6 further comprising means formed in said male and female mold members for positioning said male and female members in opposed relationship with respect to one another at a fixed distance to thereby define the depth of said junction chambers and the width of said strut beam chambers.

* * * * *